(12) United States Patent
Yoshida et al.

(10) Patent No.: US 8,330,998 B2
(45) Date of Patent: Dec. 11, 2012

(54) SCANNER DEVICE WITH EXTERNAL COVER

(75) Inventors: Shoji Yoshida, Kahoku (JP); Hideaki Shibata, Kahoku (JP); Yasuhiro Matsuda, Kahoku (JP); Masaaki Yamashita, Kahoku (JP)

(73) Assignee: PFU Limited, Ishikawa (JP)

( * ) Notice: Subject to any disclaimer, the term of this patent is extended or adjusted under 35 U.S.C. 154(b) by 538 days.

(21) Appl. No.: 12/541,239

(22) Filed: Aug. 14, 2009

(65) Prior Publication Data

US 2010/0060948 A1 Mar. 11, 2010

(30) Foreign Application Priority Data

Sep. 11, 2008 (JP) .................................. 2008-233680

(51) Int. Cl.
*H04N 1/04* (2006.01)
*G06F 3/12* (2006.01)
*B41J 2/165* (2006.01)
*G08B 29/00* (2006.01)
*B65H 85/00* (2006.01)

(52) U.S. Cl. ......... 358/474; 358/498; 358/1.13; 347/23; 726/35; 271/3.14

(58) Field of Classification Search .................. 358/474, 358/498, 1.13; 347/23; 726/35; 271/3.14
See application file for complete search history.

(56) References Cited

U.S. PATENT DOCUMENTS

| | | | |
|---|---|---|---|
| 2003/0122891 A1* | 7/2003 | Hamamoto et al. | 347/23 |
| 2008/0001343 A1* | 1/2008 | Kato | 271/3.14 |
| 2008/0056486 A1 | 3/2008 | Yoshida et al. | |
| 2010/0053701 A1* | 3/2010 | Yoshida et al. | 358/474 |

FOREIGN PATENT DOCUMENTS

| | | |
|---|---|---|
| CN | 101127817 A1 | 2/2008 |
| JP | 11-155039 | 6/1999 |
| JP | 2004-343271 | 12/2004 |
| JP | 2006-165636 | 6/2006 |
| JP | 2007-42431 | 2/2007 |
| JP | 2008-60793 | 3/2008 |

OTHER PUBLICATIONS

Chinese Office Action issued Oct. 25, 2011in corresponding Chinese Patent Application No. 200910173663.2.
Japanese Office Action issued Jul. 25, 2012 in corresponding Japanese Patent Application No. 2008-233680.

* cited by examiner

*Primary Examiner* — Charlotte M Baker
*Assistant Examiner* — Rury Grisham
(74) *Attorney, Agent, or Firm* — Staas & Halsey LLP

(57) ABSTRACT

A scanner device includes a scanner body enclosed by a housing and an external cover covering an outer side of the housing. The external cover is comprised of a plurality of external members. By spacing the adjacent external members apart from each other at the side edge parts of the housing, recesses are formed between the adjacent external members so as to constitute parts of the external design of the scanner body. Preferably, the side edge parts of the housing are exposed between the adjacent external members at the side edge parts of the housing, and information providing devices providing information on the scanner device are provided at the side edge parts of the housing exposed between the adjacent external members.

7 Claims, 4 Drawing Sheets

SCANNER DEVICE WITH EXTERNAL COVER

CROSS REFERENCE TO RELATED APPLICATION

The present invention contains subject matter related to Japanese Patent Application No. 2008-233680, filed in the Japan Patent Office on Sep. 11, 2008, the entire contents of which being incorporated herein by reference.

BACKGROUND OF THE INVENTION

1. Field of the Invention

The present invention relates to a scanner device in which an outer side of a scanner body is covered by an external cover.

2. Description of the Related Art

A scanner device includes a scanner body having a housing surrounding a reading device etc. and is designed so that documents can be read by the reading device. Further, scanner devices are generally classified into a flatbed type one which includes a glass bed on the upper surface of the housing and reads a document placed on the glass bed by moving the reading device provided inside the housing and a document scanner type one which includes an automatic document feeder (ADF), reads documents by a reading device provided inside the housing while feeding the documents from a document insertion opening formed in the housing by the automatic document feeder to the inside of the scanner body and then ejects the read documents from a document ejection opening.

In recent years, in offices and the like, demand has been rising for small desktop scanners suited for the application of digitizing paper documents on the desks of individuals. In such a desktop scanner, design has also come to be important. In some cases, in order to improve design, an external cover is further attached to the surface of the housing of the scanner body.

Further, in some flat bed types, the cover covering the glass bed can be used as an external cover, and in some document scanner types, as described in Japanese Unexamined Patent Publication No. 2004-343271, a document feed tray for placing thereon a document to be fed into the document insertion opening of the scanner body and a document ejection tray for receiving the read document can be folded up on the scanner body and made to function as an external cover.

In order to improve the design of a scanner device, it is preferable to cover the scanner body as a whole by the external cover. On the other hand, when a display unit or other supplementary function part is provided at the scanner device, not only is it necessary to electrically connect the supplementary function part with the scanner body, but it is also necessary to keep the supplementary function part from being covered by the external cover at least during use. To achieve this, it has been necessary to provide a window part at the external cover and mount the supplementary function part to the scanner body through the window part. However, the presence of the window part detracts from the external design of the scanner device. In order to not provide a window part and not detract from the external design, it has been necessary to provide the supplementary function part at the portion of the scanner body that is exposed when the document feed tray and document ejection tray that are foldably attached to the scanner body so as to function also as external covers are opened up. This has caused constraints in design.

SUMMARY OF THE INVENTION

Therefore, an object of the present invention is to solve the problems in the above related art and to improve the design freedom in a scanner device with an external cover.

In order to achieve the above object, according to the present invention, there is provided a scanner device with an external cover, which includes a scanner body enclosed by a housing and an external cover covering an outer side of the housing and adapted to read a document by the scanner body, wherein the external cover is comprised of a plurality of external members, the external members adjacent to each other at a side edge part of the housing are spaced apart from each other so that a recess is formed between the adjacent external members, and the recess forms a part of the external design of the scanner body.

In the above scanner device, the recess is formed between the adjacent external members of the plurality of external members which constitute the external cover. This recess is used as a part of the external design of the scanner body. Therefore, the materials necessary for forming an external cover can be reduced by the amount of the recess, and manufacturing costs can be reduced without impairing design.

In one embodiment, the side edge part of the housing is exposed between the external members adjacent to each other at the side edge part of the housing, and an information providing device providing information on the scanner device is provided at the side edge part of the housing exposed between the adjacent external members. For example, the information providing device may be a visual information output device providing information visually or an audio output device providing information acoustically.

In this case, the information provided by the information providing device preferably includes any of the operation status of the scanner device, number of documents read, presence of errors, operation guidance, and time and date.

By making the adjacent external members form the recess at the side edge part of the housing of the scanner body, the contour part of the scanner device (the side edge part where two surfaces are connected to each other) stands out in comparison to other parts, thereby improving the design. Further, as the side edge part of the housing is exposed between the two adjacent external members at the side edge part of the housing of the scanner body and an information providing device is provided there, even if a window part is not provided on the external cover, the information providing device and the scanner body can be electrically connected through the side edge part of the housing exposed between the adjacent external members, or functions from the information providing device provided inside the scanner body can be provided to users through the side edge part of the housing exposed between the adjacent external members. Therefore, an information providing device can be provided without impairing the external design of the scanner device.

According to the present invention, the recess is formed between the adjacent external members of the plurality of external members constituting an external cover, and this recess is used as a part of the external design of the scanner body. Therefore, the materials necessary for forming the external cover can be reduced by the amount of the recess, and manufacturing costs can be reduced without impairing design.

Further, if an information providing device is arranged at the side edge part of the housing of the scanner body exposed between the adjacent external members, functions from the information providing device can be provided to users without providing a window part on the external cover, and the information providing device can be provided on the scanner device without impairing the external design of the scanner device. As a result, this allows the range of choices in design to be widened.

BRIEF DESCRIPTION OF THE DRAWINGS

These and other objects, features, and advantages of the present invention will be described in more detail below based on preferred embodiments of the present invention with reference to the accompanying drawings, wherein.

DESCRIPTION OF THE PREFERRED EMBODIMENTS

Preferred embodiments of a scanner device according to the present invention will be described below with reference to the accompanying drawings.

Figure 1:
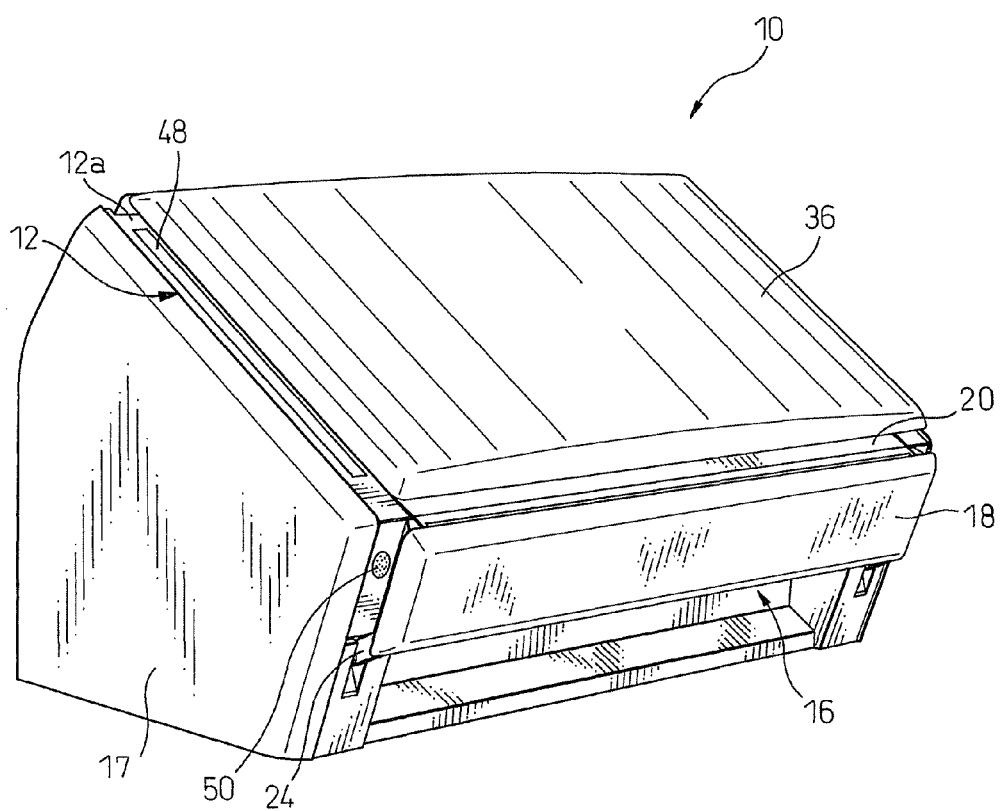
FIG. 1 is a perspective view of a scanner device according to a first embodiment of the present invention with a document feed tray and a document ejection tray being in a closed state.

A scanner device 10 shown in FIG. 1 is a desktop type designed for use on the top of an office desk or the like and includes a generally pentagonal prism-shaped scanner body 12 having a pentagonal side surface. Scanner body 12 has a housing 12a enclosing a reader unit (not shown) for reading (scanning) a document and other parts. A document insertion opening 14 is formed at the upper rear part of housing 12a, while a document ejection opening is formed at the lower front part of housing 12a. A document taken in from document insertion opening 14 is read and then ejected from document ejection opening 16.

In order to improve the aesthetic design, housing 12a of scanner body 12 have lateral external members 17, having smooth surfaces and functioning as external covers, mounted on the two lateral sides thereof. Similarly, housing 12a of scanner body 12 may have a similar external member (not shown) mounted on the back surface thereof.

Further, scanner device 10 includes a front surface cover 18 covering the front surface of housing 12a of scanner body 12 and an upper surface cover 20 covering the upper surface of housing 12a of scanner body 12.

Figure 3:
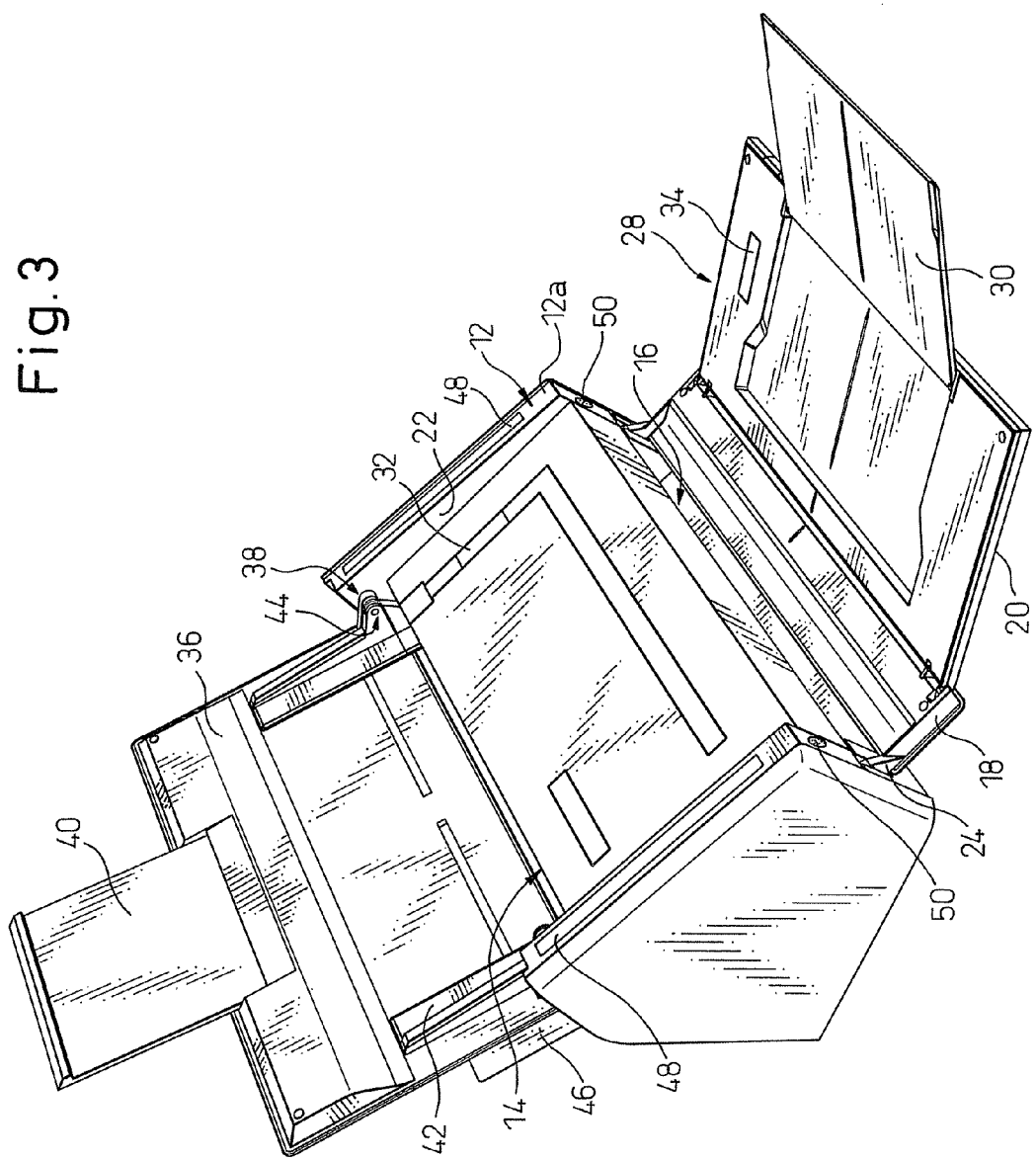
FIG. 3 is a perspective view of the scanner device of FIG. 1 with the document feed tray and document ejection tray being in an opened state.
Figure 4:
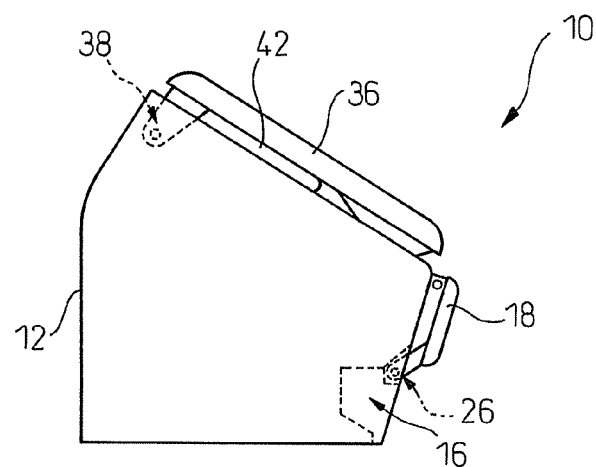
FIG. 4 is a side view of the scanner device in the state shown in FIG. 1.

Front surface cover 18 is arranged so as to cover only the portion of the front surface of housing 12a of scanner body 12 above document ejection opening 16 as shown in FIG. 1 and functions as a part of an external cover covering the front surface of housing 12a, while upper surface cover 20 is arranged so as to be held in a recess 22 formed at the center part of the upper surface of housing 12a of scanner body 12 as shown in FIG. 3 and functions as an internal cover substantially completely covering the bottom surface of recess 22 formed at the upper surface of housing 12a of scanner body 12. Note that, front surface cove 18 uses a magnet, latch, or other temporary holding mechanism (not shown) to temporarily hold the covered state of the front surface of housing 12a of scanner body 12.

Arms 24 extend from the two lateral sides of the lower end part of front surface cover 18. These arms 24 are attached near document ejection opening 16 of housing 12a of scanner body 12 so as to be pivotable about cover support portions 26. Cover support portions 26 may be configured by, for example, the combinations of cover pivot shafts provided near document ejection opening 16 of housing 12a of scanner body 12 and cover pivot shaft holes formed at arms 24 of front surface cover 18 and in which the cover pivot shafts of housing 12a of scanner body 12 are inserted. They may also be configured by the combination of cover pivot shafts protruding to the lateral sides from arms 24 of the two lateral sides of front surface cover 18 and cover pivot shaft holes formed near document ejection opening 16 of housing 12a of scanner body 12 and in which the cover pivot shafts of front surface cover 18 are inserted. It is sufficient for cover support portions 26 to connect the lower end part of front surface cover 18 and the lower front part of housing 12a of scanner body 12 so as to be pivotable, and configuration by any other structure is also possible.

Figure 5:
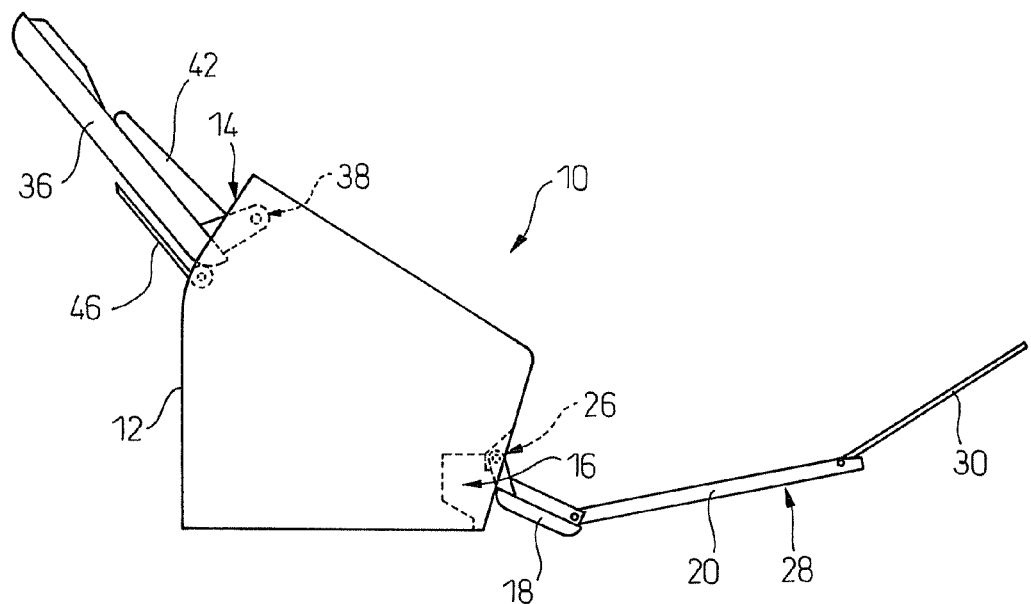
FIG. 5 is a side view of the scanner device in the state shown in FIG. 3.

The lengths of arms 24 of front surface cover 18 are determined so that, when front surface cover 18 is pivoted in a direction away from scanner body 12 about cover support portions 26 to open front surface cover 18 from a state where the front surface of housing 12a of scanner body 12 has been covered, as shown in FIGS. 3 and 5, front surface cover 18 is allowed to be lowered to a position where it can receive a document ejected from document ejection opening 16 of housing 12a of scanner body 12.

Further, front surface cover 18 and upper surface cover 20 are pivotably connected to each other at the area where they are adjacent to each other, that is, at the upper end side of front surface cover 18 and the front end side of upper surface cover 20, so that front surface cover 18 and upper surface cover 20 are separated from the front surface and upper surface of housing 12a of scanner body 12, respectively, by pivoting front surface cover 18 about cover support portions 26, to form, as shown in FIG. 1, a document ejection tray 28 for receiving a document ejected from the document ejection opening 16.

As shown in FIG. 3, it is also possible to further pivotably attach a supplementary cover 30 to document insertion opening 14 side of the inner side of upper surface cover 20 and pivot supplementary cover 30 from upper surface cover 20 and further extend document ejection tray 28 when opening front surface cover 18 and upper surface cover 20 from scanner body 12 to form document ejection tray 28.

At the bottom surface of recess 22 of the upper surface of housing 12a of scanner body 12, there are provided operation buttons 32 for operating scanner device 10 such as a scan button for initiating reading. Further, at upper surface cover 20, there is provided an operation button window 34 at a position covering the area where operation buttons 32 are arranged when arranging upper surface cover 20 to cover the upper surface of housing 12a of scanner body 12, so that operation buttons 32 can be operated through operation button window 34 even in a state when the upper surface of housing 12a of scanner body 12 is covered by upper surface cover 20. Operation button window 34 may be covered by a transparent, flexible film so as to enable operation buttons 32 to be visually recognized and operation buttons 32 to be operated.

Figure 2:
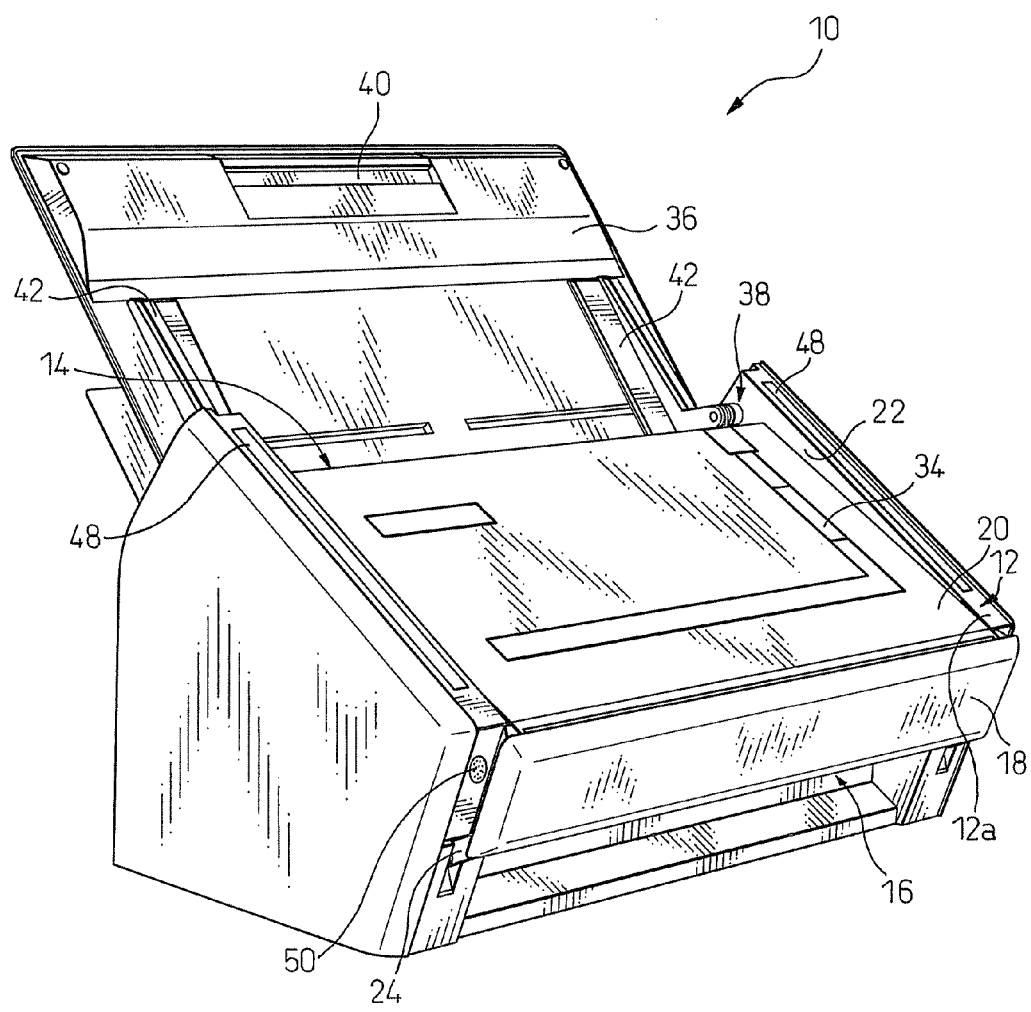
FIG. 2 is a perspective view of the scanner device of FIG. 1 with the document feed tray being in an opened state and the document ejection tray being in a closed state.

Note that, as will be understood from comparing FIGS. 2 and 3, the surface of upper surface cover 20 facing the upper side when document ejection tray 16 is closed and upper surface cover 20 is held inside recess 22 of the upper surface of housing 12a of scanner body 12 and the bottom surface of recess 22 of the upper surface of housing 12a of scanner body 12 have the same design. By using such a configuration, scanner device 10 can be made to have the same outward appearance when scanner device 10 is used in a state where document ejection tray 28 is folded up and when scanner device 10 is used in a state where document ejection tray 28 is opened up, thereby allowing an increase in design uniformity.

Near document insertion opening 14 formed at the upper rear part of housing 12a of scanner body 12, there is attached a document feed tray 36 for placing a document to be inserted into document insertion opening 14 so as to be pivotable about document feed tray support portions 38, so that, when closed so as to be folded toward scanner body 12, document feed tray 36 functions as a part of an external cover of scanner body 12.

Document feed tray support portions 38, for example, may also be configured by the combination of document feed tray pivot shafts protruding to the lateral internal sides from the two sides of housing 12a of scanner body 12 near document insertion opening 14 and document feed tray pivot shaft holes formed at the two sides of document feed tray 36 and in which document feed tray pivot shafts of housing 12a of scanner body 12 are inserted, or may also be configured by the combination of document feed tray pivot shafts protruding toward the lateral outer sides from the two sides of document feed tray 36 and document feed tray pivot shaft holes formed at the two sides of housing 12a of scanner body 12 near document insertion opening 14 and in which document feed tray pivot shafts of document feed tray 36 are inserted. It is sufficient for document feed tray support portions 38 to connect housing 12a of scanner body 12 and document feed tray 36 so as to be pivotable, and configuration by any other structure is also possible.

When document feed tray 36 is closed so as to be folded toward scanner body 12, the side edge part of document feed tray 36 opposite to document feed tray support portions 38 (the front side edge part positioned adjacent to front surface cover 18) is spaced apart from the upper side edge part of front surface cover 18 covering the front surface of scanner body 12, and the two lateral side edge parts of document feed tray 36 are spaced apart from the upper side edge parts of lateral external members 17 covering the outer surfaces of the two lateral sides of housing 12a of scanner body 12. As a result, even when document feed tray 36 is closed so as to be folded toward scanner body 12, a part of the front side edge part of housing 12a of scanner body 12 and the front side edge part of upper surface cover 20 are exposed in the space between the side edge part of document feed tray 36 adjacent to front surface cover 18 and the upper side edge part of front surface cover 18, and the side edge parts of the two lateral sides of housing 12a of scanner body 12 are exposed in the space between the two lateral side edge parts of document feed tray 36 and the lateral side edge parts of the lateral external covers, thereby forming recesses between the front side edge part of document feed tray 36 and the upper side edge part of front surface cover 18 and between the two lateral side edge parts of document feed tray 36 and the upper side edge parts of the lateral external members 17.

The above recesses constitute a part of the external design of scanner body 12 and have the effect of reducing materials necessary for the external cover without detracting from the design of scanner body 12.

A document feed tray extension plate 40 is telescopically held in the end edge part of document feed tray 36 of the side opposite to document feed tray support portions 38, so that document feed tray extension plate 40 can be pulled out from document feed tray 36 to thereby extend the length of document feed tray 36 in the document insertion direction when document feed tray 36 is pivoted in a direction away from scanner body 12 and opened.

Further, document feed tray 36 is provided with two document guides 42 slidable in the horizontal direction in FIGS. 2 and 3. Document guides 42 are slid in the horizontal direction (the width direction of document feed tray 36) to contact the two sides of a document and suppress movement of the document in the lateral direction so as to suitably guide the document to the document insertion opening 14.

Note that, as shown in FIG. 2, recess 22 provided on the upper surface of housing 12a of scanner body 12 is formed so that space above upper surface cover 20 can be secured at least at the rear side part even when upper surface cover 20 is arranged and held in recess 22 of the upper surface of housing 12a of scanner body 12. Due to this, when document feed tray 36 is folded up onto scanner body 12 in a state where upper surface cover 20 is held inside recess 22 of the upper surface of housing 12a of scanner body 12, document feed tray 36 can be held above upper surface cover 20 and, as shown in FIG. 1, the two sides of document feed tray 36 can be made to closely contact the two sides of the upper surface of housing 12a of scanner body 12.

Further, when document feed tray 36 is folded up onto scanner body 12 and closed, document insertion opening 14 is opened to the outside. Therefore, in order to prevent dust or other foreign objects from entering document insertion opening 14 during non-use, it is preferable to provide a document insertion opening cover 46 pivotable with respect to scanner body 12 near document insertion opening 14 of housing 12a of scanner body 12 so as to be able to close document insertion opening 14 when document feed tray 36 is in a closed state, as well as have the cover function as a part of the external cover.

In this way, lateral external members 17, front surface cover 18, document feed tray 36, and document insertion opening cover 46 function as external members constituting an external cover for covering the outer side of housing 12a of scanner body 12 and improving the design of scanner device 10. Further, the external members positioned adjacently at side edge parts of housing 12a of scanner body 12 are spaced apart from each other, thereby forming recesses between the adjacent external members. The formed recesses are used as a part of the external design of scanner body 12.

Further, in scanner device 10 according to the present invention, at least portions of the side edge parts of housing 12a of scanner body 12 are exposed at the recesses formed between the adjacently positioned external members. Information providing means for providing information on scanning device 10 are provided at the exposed side edge parts of housing 12a of scanner body 12. Information on scanner device 10 includes an operation status of scanner device 10 such as "in operation" or "idle", the number of documents read, the type of error, assistance in operation, time and date, and the like. Further, as information providing means, there are included a visual information output device 48 providing visual information including a light emitting element, such as a lamp or LED, and a display device, such as a liquid crystal display or organic EL display, and an audio output device 50 providing information acoustically including a buzzer and speaker. For example, by changing the color of the light emitting member, the operation status and error type can be visually indicated, or by displaying text on the display device, the number of documents read, the time and date, the error type, and the like can be visually indicated. Further, by emitting warning sound from the buzzer, the occurrence of error can be acoustically informed, or by outputting voice messages from the speaker, the error type and operation procedure can be acoustically informed.

In the illustrated embodiment, light emitting elements are provided as visual information output devices 48 at the portions exposed between lateral external members 17 and document feed tray 36 at the two lateral side edge parts of the upper surface of housing 12a of scanner body 12, so that the colors of the light emitting elements indicate the operation status of scanner device 10. Further, compact speakers are provided as audio output devices 50 at the portions exposed between lateral external members 17 and front surface cover 18 at the two lateral side edge parts of the front surface of housing 12a of scanner body 12, so that the occurrence of errors and the operation procedure guidance can be output by warning sounds and voice messages. If liquid crystal displays or other display devices are provided in place of light emitting elements as visual information output devices 48, information such as the number of read documents and error type can be displayed by text.

Next, the operation of scanner device 10 shown in FIGS. 1 to 5 will be described below.

When not in use, document feed tray 36, document ejection tray 28, and document insertion opening cover 46 are folded up in a compact state as shown in FIG. 1. When opening document insertion opening cover 46 from this state and, further, when pivoting document feed tray 36 in a direction away from scanner body 12 to open it, as shown in FIG. 2, upper surface cover 20 is exposed. If necessary, document feed tray extension plate 40 may be pulled out from the end edge (upper end edge) of document feed tray 36 opposite to the document feed tray support portions 38 so as to extend document feed tray 36 and be able to place a longer document on document feed tray 36.

Since document ejection opening 16 is not covered by front surface cover 18, even in this state, by pressing the scan button of operation buttons 32 through operation button window 34 of upper surface cover 20, the reading operation can be begun, thereby taking the document placed on document feed tray 36 into scanner body 12 from document insertion opening 14 and then ejecting the read document from document ejection opening 16. Note that, in this state, as there is no document ejection tray 28, it is necessary to secure space for a document to be ejected outside of document ejection opening 16.

Further, since audio output devices 50 are provided at the portions exposed between lateral external members 17 and front surface cover 18 at the front surface of housing 12a of scanner device 10, even when front surface cover 18 is not opened as in the above, warning sounds and voice messages can be output from audio output devices 50 to notify error occurrence and operation procedure.

When opening front surface cover 18 in a direction away from the front surface of scanner body 12 from the state shown in FIG. 2, upper surface cover 20 is also separated from scanner body 12 along with front surface cover 18 to thereby form document ejection tray 28 as shown in FIG. 3. Front surface cover 18 is connected to the lower front part of scanner body 12 through arms 24. Therefore, when pivoting front surface cover 18 about cover support portions 26, as shown in FIG. 3, front surface cover 18 moves down until a position where it can receive a document ejected from document ejection opening 16, thereby enabling a document ejected from document ejection opening 16 to be received on document ejection tray 28. If necessary, supplementary cover 30 held in the inner side of upper surface cover 20 may be pivoted with respect to upper surface cover 20 and opened so as to extend document ejection tray 28 to be able receive a longer document.

When operating scanner device 10, the operation status of scanner body 12 and other information can be visually provided by changing the colors of visual information output devices 48 provided at the two lateral side edge parts of the upper surface of housing 12a of scanner body 12, and error occurrence and operation procedure can be notified by outputting warning sounds and voice messages from audio output devices 50 provided at the two lateral side edge parts of the front surface of housing 12a of scanner body 12.

In this way, by spacing adjacent external members of the external cover covering the outer side of housing 12a of scanner body 12 apart from each other to form recesses between the adjacent external members and using the formed recesses as part of the external design of scanner body 12, the amount of materials necessary for forming the external cover can be reduced without impairing the external design. Further, by providing information providing devices at the recesses formed in the gaps between the adjacent external members constituting part of the external design of scanner body 12, it is no longer necessary for a window part for electrically connecting the information providing device to scanner body 12 to be provided in the external cover. Consequently, the presence of the window part will not detract from the external design. Therefore, it becomes possible for an information providing device to be added to scanner device 10 as a part of a user interface for increasing user operability without detracting from the external design of scanner body 12.

Although the scanner device according to the present invention has been described based on the illustrated embodiments, the present invention is not limited to the illustrated embodiments and it should be apparent that numerous modifications could be made thereto by those skilled in the art without departing from the basic concept and scope of the present invention.

The invention claimed is:

1. A scanner device with an external cover, comprising a scanner body enclosed by a housing and
an external cover covering an outer side of the housing and adapted to read a document by the scanner body,
wherein said external cover is comprised of a plurality of external members including two lateral external members, a front surface cover, a document feed tray, and a document insertion opening cover,
wherein when the document feed tray is closed so as to be folded toward the scanned body, the side edge parts of the two lateral sides of the housing of the scanner body are exposed in the space between the two lateral side edge parts of the document feed tray and the upper side edge parts of the lateral external members, thereby forming recesses between the front side edge part of the document feed tray and the upper side edge part of the front surface cover and between the two lateral side edge parts of the document feed tray and the upper side edge parts of the lateral external members, said recesses forming a part of an external design of said scanner body.

2. The scanner device according to claim 1,
wherein when the document feed tray is closed so as to be folded toward the scanner body, two lateral side edge parts of the upper surface of the housing of the scanner body are exposed between the lateral external members and the document feed tray or two lateral side edge parts of the front surface of the housing of the scanner body are exposed between the lateral external members and the front surface cover, and wherein an information providing device providing information on said scanner device is provided at said two lateral side edge parts of the upper surface of the housing of the scanner body or at said two lateral side edge parts of the front surface of the housing of the scanner body.

3. The scanner device according to claim 2, wherein said information providing device comprises a visual information output device providing information visually.

4. The scanner device according to claim 2, wherein said information providing device comprises an audio output device providing information acoustically.

5. The scanner device according to claim 2, wherein the information provided by said information providing device includes any of the operation status of said scanner device, number of documents read, presence of error, operation guidance, and time and date.

6. The scanner device according to claim 3, wherein the information provided by said information providing device includes any of the operation status of said scanner device, number of documents read, presence of error, operation guidance, and time and date.

7. The scanner device according to claim 4, wherein the information provided by said information providing device includes any of the operation status of said scanner device, number of documents read, presence of error, operation guidance, and time and date.

* * * * *